United States Patent [19]

Vanago

[11] Patent Number: 4,592,401
[45] Date of Patent: Jun. 3, 1986

[54] METHOD FOR MITER JOINTING FRAMES AND APPARATUS FOR THE IMPLEMENTATION THEREOF

[76] Inventor: Joseph Vanago, 1, Rue des Chaux, Francheville Le Haut, France

[21] Appl. No.: 499,165

[22] Filed: May 16, 1983

[30] Foreign Application Priority Data

Sep. 16, 1981 [FR] France .................. 81 17609

[51] Int. Cl.⁴ .......................... B27D 1/00; B27F 7/00
[52] U.S. Cl. ..................................... 144/346; 83/452; 83/484; 83/613; 144/1 R; 144/3 R; 144/136 R; 144/144.5 R; 144/137; 144/216; 144/353
[58] Field of Search .............. 144/1 R, 2 R, 3 R, 345, 144/346, 353, 355, 136 R, 144.5, 216, 137, 217; 227/148, 30; 83/484, 409, 425.2, 435.1, 437, 452, 581, 613

[56] References Cited

U.S. PATENT DOCUMENTS

| | | |
|---|---|---|
| 1,700,683 | 1/1929 | Madsen . |
| 2,864,414 | 12/1958 | Mazzola .................. 144/136 |
| 2,917,089 | 12/1959 | Ennis ........................ 144/3 |
| 3,734,381 | 5/1973 | Blevio ..................... 227/148 |
| 4,127,226 | 11/1978 | Jasper ..................... 227/69 |

FOREIGN PATENT DOCUMENTS

| | | |
|---|---|---|
| 61792 | 2/1891 | Fed. Rep. of Germany . |
| 55415 | 2/1891 | Fed. Rep. of Germany . |
| 538161 | 11/1931 | Fed. Rep. of Germany . |
| 2838233 | 6/1979 | Fed. Rep. of Germany . |
| 2919564 | 11/1980 | Fed. Rep. of Germany . |
| 2927942 | 1/1981 | Fed. Rep. of Germany . |
| 2142621 | 2/1973 | France . |
| 328819 | 5/1958 | Switzerland . |
| 337653 | 5/1959 | Switzerland . |

*Primary Examiner*—W. D. Bray
*Attorney, Agent, or Firm*—Sandler & Greenblum

[57] ABSTRACT

The method for jointing frames, small pieces of furniture, drawers, with corner parts, is characterized by the successive operations: simultaneously cutting the sides of the frame to the desired dimensions; machining the halving of each corner part in a single operation into two adjacent elements of the frame to be assembled and simultaneously in the four corners; gluing the corner parts and their housing hollowed out in the elements to be assembled; the premounting of corner parts in their housings; the assembly and tightening of the frame thus formed. The corner parts used are flat with one or two ogival ends and/or one straight end and/or one whistle-shaped end forming a 90° angle, and/or one bevelled end and/or one rounded end, and/or one circular end.

16 Claims, 36 Drawing Figures

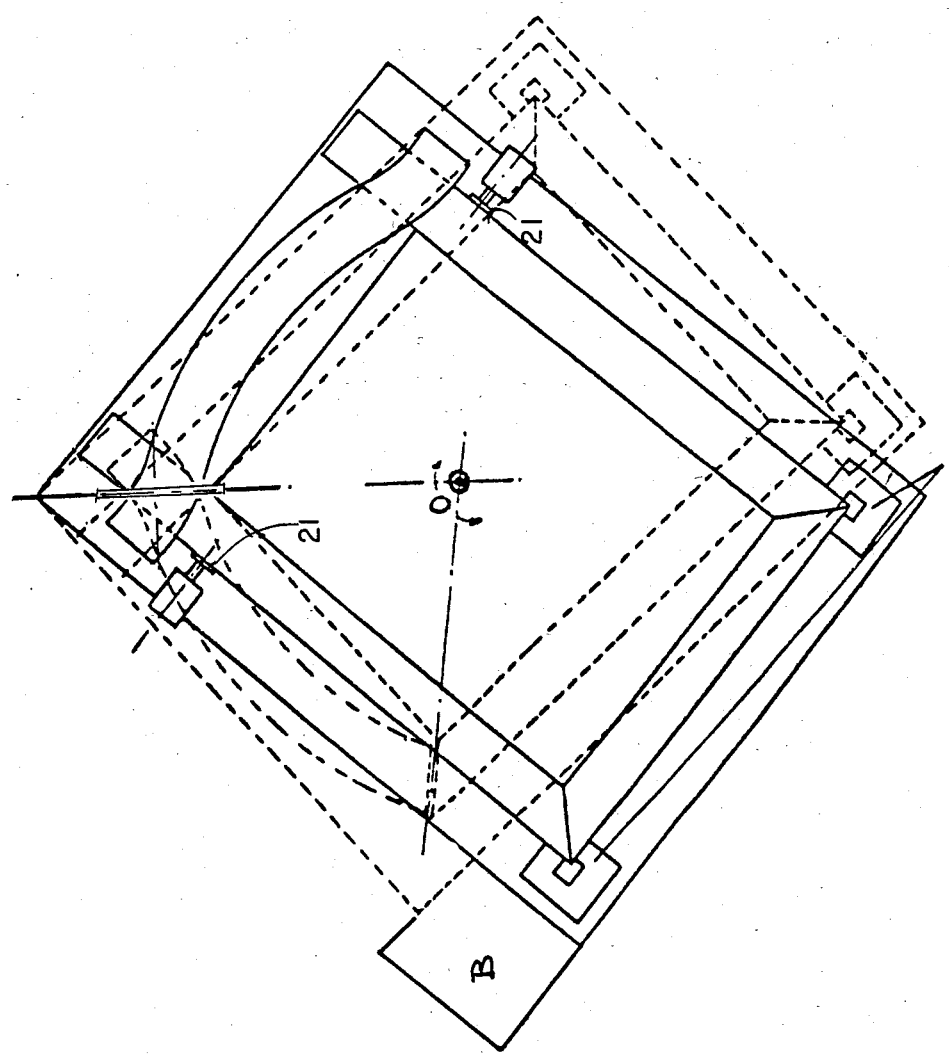

METHOD FOR MITER JOINTING FRAMES AND APPARATUS FOR THE IMPLEMENTATION THEREOF

BACKGROUND OF THE DISCLOSURE

1. Field of the Invention

The present invention generally relates to a method for jointing mitered frames using corner parts having new configurations. The present invention is equally directed to machines and apparatus for performing this method in order to permit the cutting and machining of several corner parts simultaneously.

2. Discussion of Prior Art

A number of models of corner parts are known which have different shapes, including square, rectangular, oval or cylindrical. Such corner parts are often formed of wood and are placed within mitered frames. Only the cylindrical parts, however, are used industrially. Such parts are referred to as journals and have both advantages and disadvantages.

There are a number of advantages. By using such a corner part only a single type of machining has to be performed on two parts to be jointed; machining will not weaken the wood members; it is easy to use drills having fixed interaxes; precision is increased; rigorous prepositioning of the parts will result; the joints can easily be standardized, with the drills or journals capable of being integrated into the machining assembly line; economies in the amount of wood are realized, the length of the parts being limited to the tenoning; the use of false pegs is permitted; it becomes possible to join curved wooden parts whose grain is cut; and it becomes possible to precisely position various pieces of disassembled furniture together, e.g., the side, the top, the bottom and partition.

There are also a variety of inconveniences, however. The use of journals requires a supplemental operation on a special machine; it is not possible to overcome machining which is not performed with a great deal of precision (i.e., frames having 45° cuts in the profile); when large crosspieces are used the system will not prevent cracks caused by wood shrinkage; the journals are not suitable to join parts of small sections in which two journals cannot be housed in view of the minimum interaxis; it requires the use of calibrated journals and drilling without any play about the diameter of the journal; the journals must be driven into their housings by a hammer or gun; and it is impossible to simultaneously have perfectly calibrated journals and drilled holes without any play. When the journals are driven they cause a number of problems, including: divergent axes; caulked tips which prevent parallel driving, or even all jointing while requiring manual retouching of the journal tip; and in both of the latter cases, warped frames and shifting members result which cannot be overcome by mitering, particularly if the parts are profiled.

In addition to the above-noted faults caused by the journals themselves, drilling the journal housing is also delicate. If the machines used in drilling are precise, the drill bits used will not remain precise. In other words, at the beginning the drill bits will be perfectly concentric, as will be the chucks which are utilized. During machining, however, the drill bits become hot and therefore dull, thereafter warped, and thus no longer permit drilling without play. In fact, divergent or plunging drilling result which causes the frame elements or the veil (once mounted) to be uneven. Overcoming these faults is impossible. If it is really necessary a manual retouching can be performed, but this is a long and delicate process, particularly if the frames are profiled. As a result this procedure is quite onerous.

SUMMARY OF THE INVENTION

One of the goals of the present invention is to provide a corner part having a shape which permits machining of two or four framed elements simultaneously. This machining creates a housing into which the corner part can be inserted. Such corner part is flat, has a conventional thickness which is equal to a third of the thickness of the elements to be assembled, can be formed from wood, metal or any other material, has rounded, beveled, ends (either whistle or ogival cut), and a surface which can be striated to hold a glue film which is positioned therein. The corner part of the present invention offers the advantages of a journal but does not create all of the disadvantages or inconveniences thereof. Additionally, it is advantageous for several reasons: (a) a single type of machine can be used on two parts to be jointed; (b) machining will not weaken the wood; (c) it is easy to machine and join the members by using a simple machine and a template; (e) it is precise procedure; (f) the parts can be strongly prepositioned; (g) it is easy to standardize the machines, e.g., the rip saw, power saw, and mortise assemblies, as well as to easily integrate them into the machining line; (h) less wood is used as the length of the parts is limited to the tenoning; (i) the conventional aspect of journals are preserved; (j) real pegs can be placed in a conventional fashion rather than in a false fashion as with a journal, in order to reinforce the joint; (k) jointing of curved parts is made possible in which the wood grain is cut; (l) the corner parts can be positioned without special machines; (m) the precision of the machine jointing is absolute and there is no need for adjusting the same; (n) when large crosspieces are used, the jointing process prevents cracks which otherwise occur due to wood shrinkage; (o) the corner parts are suitable even to join very small cross-sectional parts; (p) the aesthetic aspect of the assembly is preserved, as even the use of genuine old style pegs is permitted, which will enhance the authenticity of the structure.

The invention equally relates to machining and jointing devices for performing the method which are relatively simple machines equipped with special apparatus, e.g., templates. This permits economical and rapid industrial or small scale work in whose execution is precise in order to guarantee the advantages set above.

BRIEF DESCRIPTION OF THE DRAWINGS

The annexed drawings represent several examples of corner part configurations formed in accordance with the present invention as well as diagrams of machines used to form the corner parts and the matter in which they are used, this should permit understanding of the present invention, particularly when taken in conjunction with the description which follows, wherein:

FIG. 31 illustrates the positioning of a template in a plurality of operations, the solid lines illustrating the first orientation of the template and the dotted line the secondary position of the template;

DETAILED DESCRIPTION OF THE DRAWINGS

The corner parts illustrated in FIGS. 1-9 have configurations which vary as a function of the tools which are used to machine them and as a function of the direction of the machining, which can go from the inside of a frame to the exterior, or viceversa.

Figure 1:
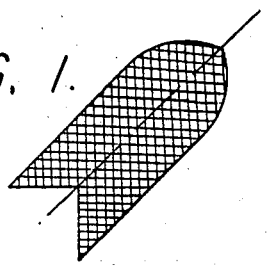
FIGS. 1-9 represent different configurations of corner parts formed in accordance with the present invention.
Figure 2:
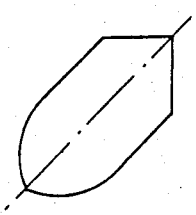
Figure 3:
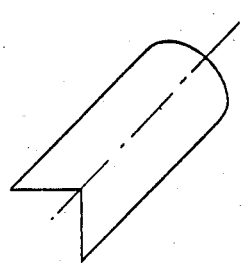
Figure 4:
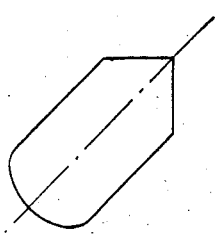
Figure 8:
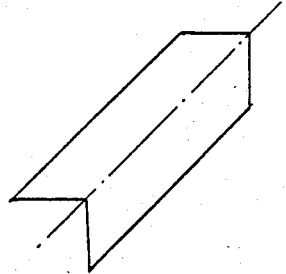
Figure 10:
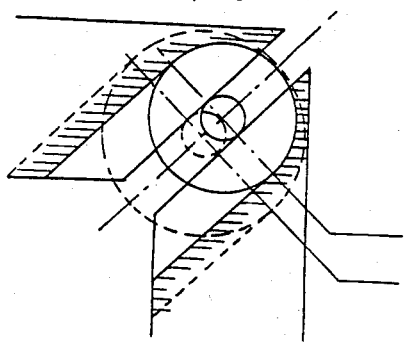
FIG. 10 is a sectional view of a frame which has been machined to form a hollow housing to receive one of the corner parts of FIGS. 1-9.
Figure 11:
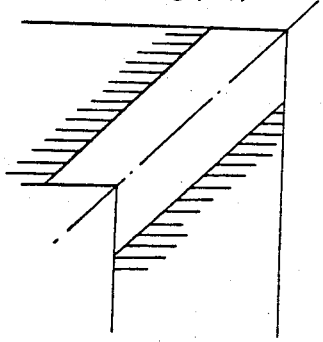
FIGS. 11-18 are sectional views of corner parts positioned in place within respective housings.
Figure 12:
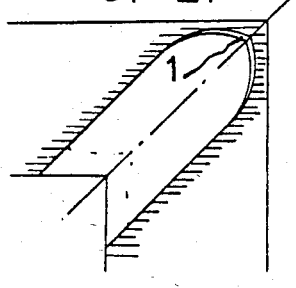
Figure 13:
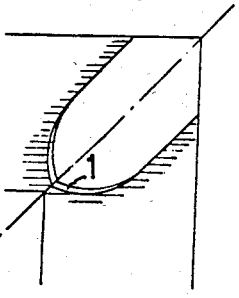
Figure 14:
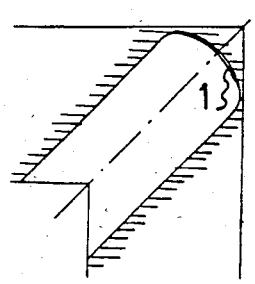
Figure 15:
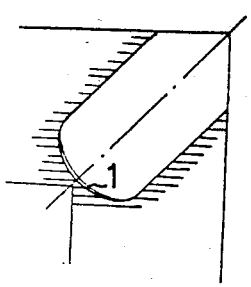

The exterior surface of the corners comprises a housing; the housing illustrated in FIGS. 1, 2 and 8 is hollowed out from a generally right angle framework, as illustrated in FIGS. 10-18. A rip saw is used to form the corner part of FIG. 1, which has an ogival head and a generally whistle-shaped tail having two points which form a 90° angle. As illustrated in FIG. 12, this corner part can be positioned within the hollow portion of a frame. The corner part illustrated in FIG. 2 has a beveled head and an ogival tail which can be positioned within the groove illustrated in the corner piece of FIG. 13. The corner part of FIG. 8 has a beveled head and a whistle tail and can be positioned in the hollowed corner portion of the frame illustrated in FIG. 11. If a mortise machine having a vibrating chisel is used rather than a rip saw to hollow out the housing, the corner parts illustrated in FIGS. 3, 4 and 8 are to be used. FIG. 3 illustrates a corner part having a rounded head and a whistle-shaped tail which can be inserted into the housing of FIG. 14; the corner part of FIG. 4 has a beveled head and a rounded tail which can be inserted into the hollowed out portion of the framework corner illustrated in FIG. 15; and the corner part illustrated in FIG. 8, as noted above, can be positioned within the hollowed out portion of the framework illustrated in FIG. 11.

Figure 6:
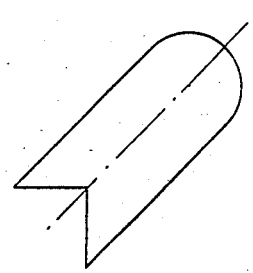
Figure 7:
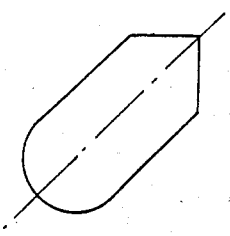
Figure 16:
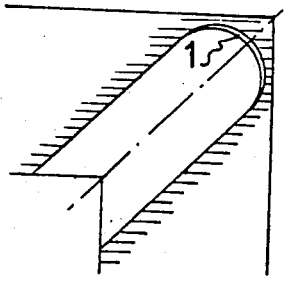
Figure 17:
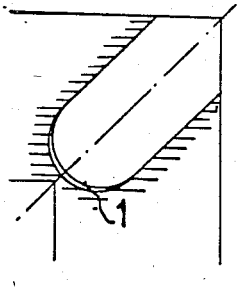

When the cutting is performed by a chain driven mortise machine, the corner part illustrated in FIG. 6, having a rounded head and whistle tail, can be positioned within the hollowed corner portion illustrated in FIG. 16; the corner part of FIG. 7, having a beveled head and a rounded tail, can be positioned within the hollowed out framework of FIG. 17; and the corner part of FIG. 8 can be positioned within the hollowed out corner portion of FIG. 11.

The rounded portion of the corner parts of FIGS. 6 and 7 each has a radius which corresponds to the radius of the chain cutter which is being used.

With respect to the hollowed out corner illustrated in FIG. 11, the housing can be machined in either of two directions, as the housing extends from one end to the other of the frame.

Figure 9:
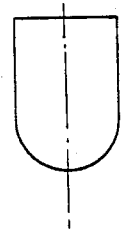
Figure 18:
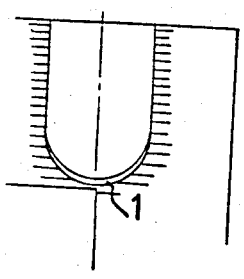

The corner part illustrated in FIG. 9 is adapted to be positioned within the hollowed corner of the framework of FIG. 18.

FIGS. 12-18 illustrate a hollow space 1 which represents the play necessarily provided between the end of the hollowed portion of the framework and the end of the corner part, which will receive excess glue and which will enhance and facilitate placement of the corner part within the hollowed corner portion.

The jointing of the corners illustrated in FIGS. 12-18 will prevent cracks which would otherwise occur due to wood shrinkage.

Figure 5:
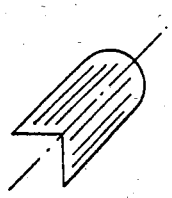

The corner part illustrated in FIG. 5 is formed from grooved or striated metal. This corner portion permits a real peg to be inserted in an old fashioned style, and also permits frames to be jointed even when the elements have small cross sectional areas.

The corner part illustrated in FIG. 9 can be positioned within the hollow corner illustrated in FIG. 18, which is illustrated as a right angle jointing which is not otherwise angled.

With respect to FIG. 10, the hollowed portion of the housing which is formed by a rip saw having a milling cutter diameter 50 is illustrated by the solid line; the outline of the housing represented by diameter 70 is illustrated by the dash line.

The corner parts of FIGS. 1-8 can be machined with a uniformed precision, particularly with respect to their thicknesses and the parallel sides of the corner parts. This is guaranteed by the simultaneous milling or mortising of a column and a cross piece (or of a desired frame corner). Such machining is performed with the sides to be jointed located completely flat within the template.

To insure an even more perfect jointing and flatness of the machine frames, the corner part itself is sanded to calibrate its thickness. Such calibration permits the corner part which is the previously glued within the housing without the special machine to be slid manually.

Figure 19:
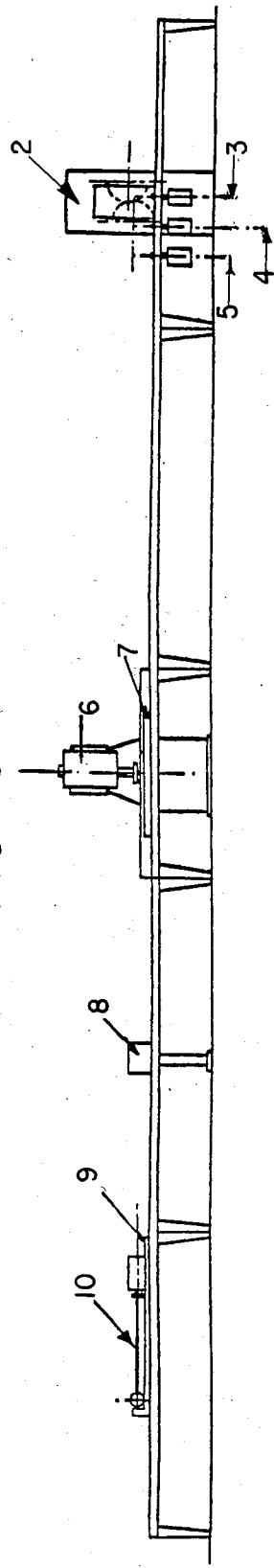
FIG. 19 is a plan view of an assembly line using a plurality of stations for performing the method of the present invention.
Figure 20:
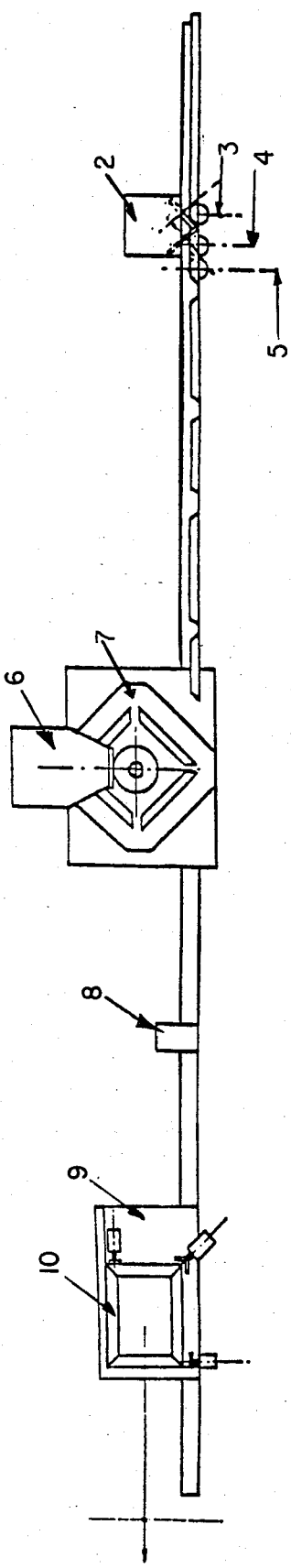
FIG. 20 is a top plan view of the assembly of FIG. 19.

The method illustrated in FIGS. 19 and 20 includes a first phase in which precutting of the frame members is performed. This precutting develops four sides of the frame to be used. The lengths of the frame pieces which are thus obtained comprise four sides (which may or may not be profiled) which are machined by vertical power saw 2, having two circular blades adjusted at 90° with respect to each other. These blades are mitered by raising and lowering the power saw head. The sized members which are thus obtained comprise the desired framework; the length and the width of each side are preselected due to the distance of stops 3, which are positioned to achieve this affect and which permit the wood to be cropped. Stop 4 defines the width of the frame and stop 5 defines the length of the frame. If the frame is squared after first stop 3, the second stop 4 will simply be duplicative.

In the second phase of the method, the rip saw will then be used to mechanically cut a hollow portion out of the corner of the frame. This is achieved by sending the framework sides towards the rip saw 6 where they are positioned and tightened within a template 7 to form the desired framework. When it is so formed, the spacing which results permits passage of a tool therein. The template is positioned so as to permit corner by corner simultaneous machining of two framework sides, or simultaneous machining of a column and a cross piece. This permits simultaneous machining of the hollow housing for receiving a corner part.

This operation conclusively guarantees the creation of a housing which will be perfectly parallel with respect to the rip saw table, which serves as a reference. It also guarantees a placement milling which will have a constant thickness and dimension for the four hollow housings for receiving the frame corner parts. Machining can be achieved without difficulty if it is directed from the interior of the frame toward the exterior of the framework, or from the framework exterior towards the framework interior. It is also possible to machine the four hollow portions into which the four corner parts will be positioned simultaneously with four rip saw heads which are located under the table or which are suspended to permit easy placement of the column and cross pieces of the frame to be machined. The minimum dimension of the frame will be limited only by the bulkiness of the rip saw heads.

The four sides of the framework which are thus obtained are directed toward gluing station 8, where the mitered portions are glued, as are the corner parts into the hollow portions.

During premounting, the corner parts are slid within the housing; thereafter, the framework is assembled at framing station 9 (FIGS. 19 and 20).

If the framework is mounted about a panel, e.g., of a door, the sides will be preassembled (i.e., the corner parts will be positioned in place) about the panel.

The apparatus next proceeds to its final mounting/framing at station 9, which is located within mobile template 10 which is removed to the drawing station (not illustrated) if either the frame or the door which results cannot be pegged. The number of templates is provided as a function of the drying time of the apparatus. If, to the contrary, the desired door or framework can be pegged, "invisible needle hooks" or real wood pegs which have been conventionally used in old style housing can be attached.

The locking of the frame joints or of the doors in such fashion can negate the need for having a drying station.

Machining can be effected with a mortise machine having a vibrating chisel which extends from the exterior of the framework towards the interior by using a mortise machine having a single head. Such a machine will take the place of rip saw 6. When template 7 is used, there thus be no necessity to provide a passage for the tail of a milling machine which would otherwise machine the placement of the corner part. The mitered sides which have been previously glued and tightened are then placed in the template, thereby negating the need for framing and gluing stations.

Machining of the hollow portions which are adapted to receive the corner parts is effected, corner by corner, by rotating the template. Before removing the frame, corner parts are positioned after being glued. If the frame is either hooked or pegged, it is positioned in the template with its back facing upwardly. If it is pegged in a conventional fashion, it will be positioned front side up. If there is a central panel, e.g., as in furniture or doors, it is positioned at the start of the process. In this fashion, a finished framework or door is provided which can be immediately sanded.

Figure 21:
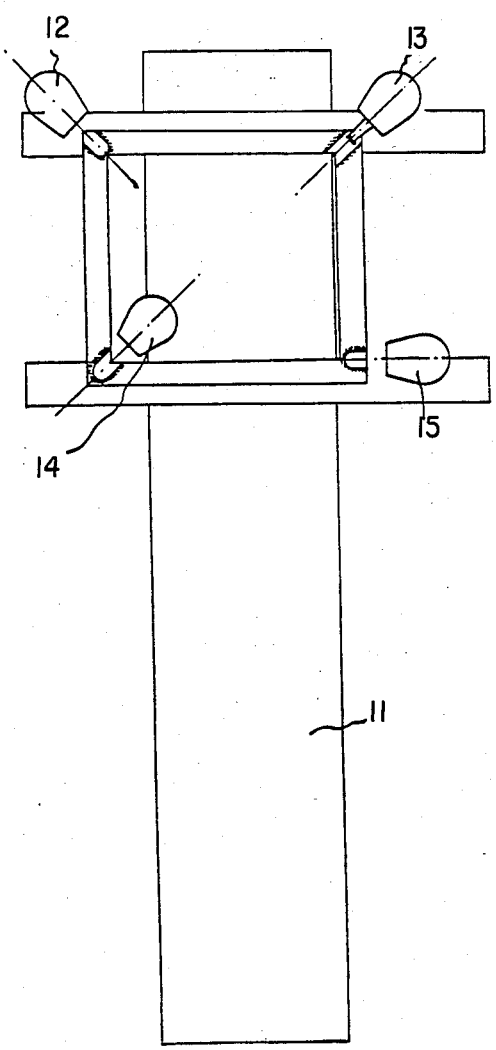
FIG. 21 is a schematic plan view of forming machines positioned relative to the corners of a frame to machine the housings to receive corner parts.

As illustrated in FIG. 21, a machine with four heads can also be used. This machine can use any type of conventional tool, and can thereby receive mortise machine heads having chisels or chains, similar drilling heads, or mortise machines having drill bits.

As illustrated in FIG. 21, a machine has a base 11 upon which a fixed frame and mobile frame are positioned. On each of these frames machining groups 12 through 15 can be provided.

Machining groups 12 and 13 are aligned and their position is fixed. These machining groups provide a reference for the framework and can be moved closer to each other or spread apart by the mobile frame.

Machining groups 14 and 15 are mobile in order to form different frame dimensions, and they are capable of sliding along their corresponding frames.

Each machining group 12–15 has its own slide and is capable of orienting itself as a function of the angle of the jointing which is desired. This angle can be different for each group as a function of the framework which is being machined. If the machining groups which are held constitute rip saws, it will be necessary to use a template 7. In other cases, the machine can comprise its own pressing element which insures that the elements of the frame will contact each other, and that the framework will become square.

According to the framework dimensions, all of the groups of the machine can work in two directions, i.e., either they can cut the framework from the inside of the frame towards the exterior of the frame or vice-versa. The machines are also capable of machining the position of all of the corner parts illustrated in FIGS. 1–8.

The number of machining groups varies a function of the number of operations which are envisioned and of the material which is employed.

For example, if the material is wood, in a majority of cases cutting will be necessary and the schematic process illustrated in FIGS. 19 and 20 will be required, with the variation as noted above. Further, rip saw 6 will have to be replaced either by mortise machines or by the machine described above, which will shorten the process by grouping the machining, gluing, framing and pegging steps at a single station.

If the material is plastic or metal, the quality of the product will be a constant and precutting will no longer be required. It will then be possible to cut the four mitered sections in a single operation on the machine illustrated in FIG. 21, by bringing the four power saw heads which cut the four profiles onto each other in superimposed fashion, two by two.

Two standard length profiles are illustrated and will form the cross pieces on the right and left hand frames. The other profile lengths will be provided to serve as columns which are positioned perpendicularly with respect to the first two profiles and which will be superimposed upon them. These profiles will be supported between the power saws by two support guides. The power saws then cut the four mitered sections simultaneously. Once these are cut, the cross pieces will rest on the right and left frames. The excess material or refuse is rejected, the two support guides are lowered, and the columns then come to rest on the right and left hand frames. The machine next proceeds to framing and jointing the frame. The profiles are then slid to be recut. This technique can be used with wood but only if a perfectly homogenous, faultless raw product material is utilized.

Hollow housings for the corner parts can also be machined from the interior of a framework toward the exterior of the framework by using the machine having between one and four heads, which then forms the corner parts illustrated in FIGS. 3–8. The minimum dimensions of the frame to be machined are, in the case of such corner parts, a function of the bulk of the head of the mortise. This machining is achieved, for small frames, in a corner by corner fashion, four sides of the frame being mortised two by two on a mortise machine having only a single head. The gluing and framing process is then resumed.

The housings for the corner parts can be machined by a chained mortise machine in a similar fashion to that obtained with a mortise machine having chissel bits. It is suitable for forming the corner parts of FIGS. 6–8.

When using a mortise machine having drill bits the same process is performed but can be disadvantageous in that it must be relatively quickly formed.

When the frames are of a great thickness it is easy to provide two or three corner parts which can be simultaneously machined without difficulty.

When the frames have cross pieces which are not of the same width as the columns, the machining does not entail any additional difficulty. The heads which machine the hollow portions into which the corner parts are to be positioned are oriented with respect to the mitered sections which they form together when there are multiple heads. On a simple machine the template illustrated in FIG. 31 can be oriented for such an operation.

If the frames comprise one or more cross pieces of a configuration known as a policeman's hat, or a curved form, they can be used for e.g., window frames and stylish doors: Such cross pieces 17 can have precut lengths and can be separately machined.

A band can be precut which takes into account the length of the three remaining sides of the frame and which can be machined as necessary. Mitering of the mitered sections which connect the lower crosspiece of the two columns, as illustrated in FIGS. 19 and 20, is performed by power saw 2.

Figure 22:
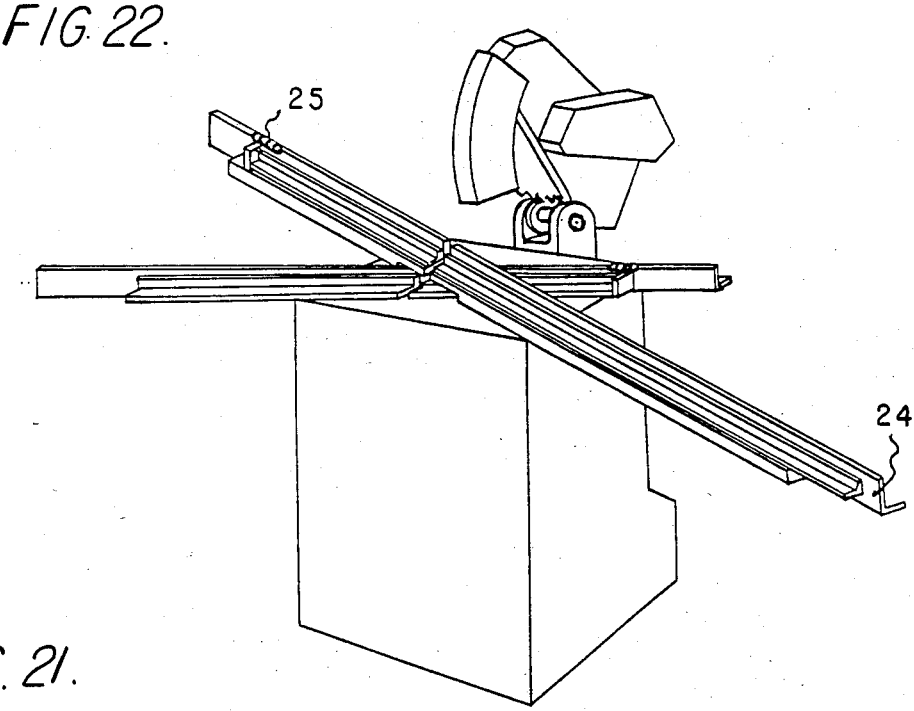
FIG. 22 illustrates a framework profile which is adapted to cut special corners therefrom.
Figure 26:
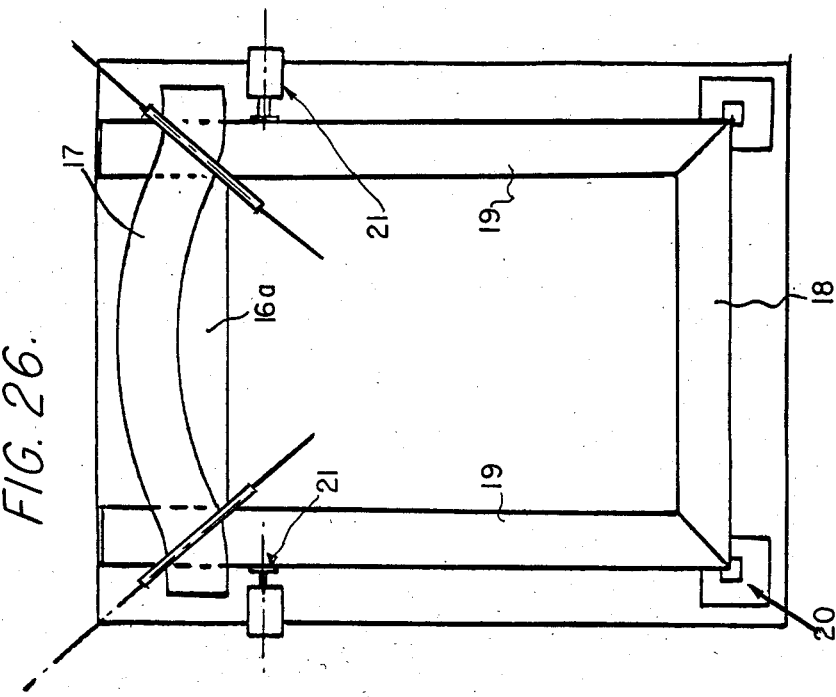
FIG. 26 is a frame assembly position on the template of FIG. 25.
Figure 25:
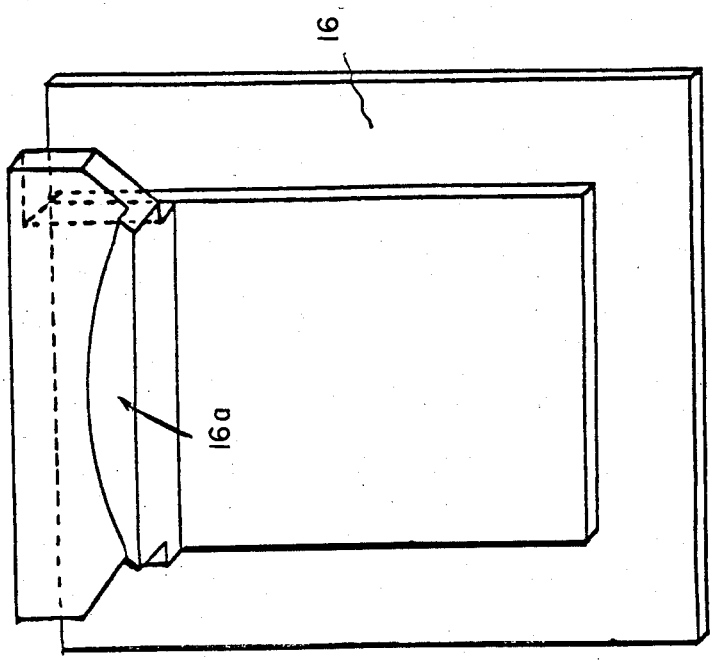
FIG. 25 illustrates a framework assembly template having a crosspiece which is referred to as "policeman's hat"
Figure 27:
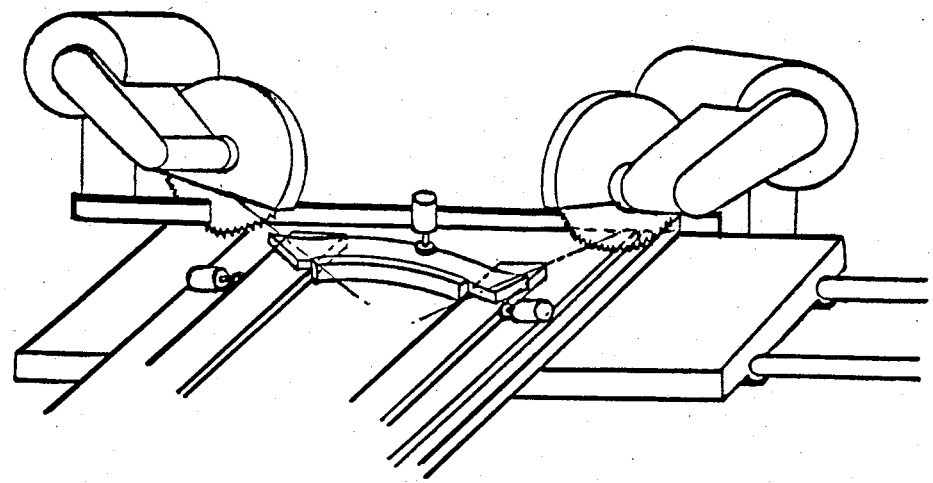
FIG. 27 illustrates the template of FIG. 25 attached to a double powersaw table.

Miters which connect crosspiece 17 of the upper sections of columns 19 are simultaneously formed to obtain a perfect jointing on template 16, as illustrated in FIG. 25. For such jointing, and as illustrated in FIG. 26, lower cross piece 18 and two columns 19 which have been previously cut are positioned on template 16. In this case, the lower mitered sections are held tightly by stops 20 as a function of the desired dimensions of the framework. The upper sections are then applied against template 16 by pressing elements 21. The upper section of template 16 is machined in such a fashion so as to permit superimposing and pressing of the cross top piece, whether it be a curved cross piece or a "policeman's hat", on two columns 19 which are already held tightly under the support of a form which precisely fits about the profile of cross piece form 16a. The four sides of the framework are thus positioned and pressed within template 16. The template is either fixed on the table of double power saw, which as illustrated in FIG. 27 is previously adjusted to the desired dimensions and jointing angles, and simultaneously the columns and the cross pieces are mitered. Alternately, the template is attached to the front of a power saw having one blade, as illustrated in FIG. 22. The two mitered sections are then cut, one after the other, by orienting the template about an axis 0 until stopped b which results in a left hand mitered section illustrated by a solid line and a right hand mitered section illustrated by a dash line in FIG. 31. In these two cases, once cutting has occurred the method will continue on rip saw stations 6, as illustrated in FIGS. 19 and 20.

Figure 30:
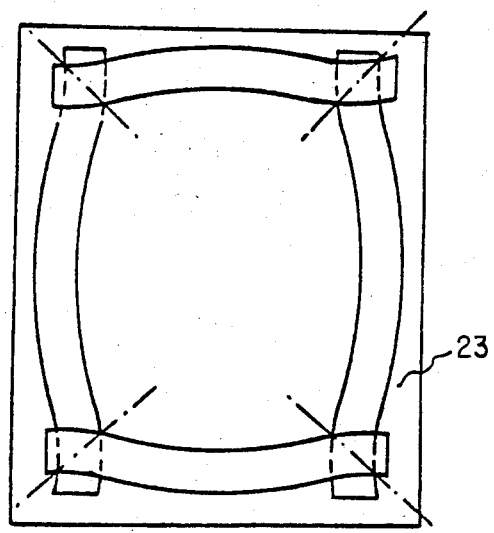
FIG. 30 is a frame template having four crosspiece forms.
Figure 29:
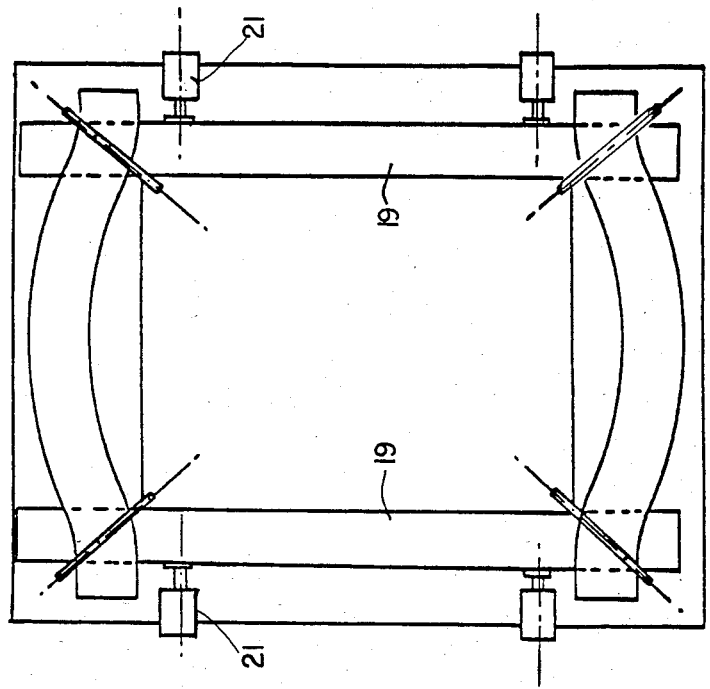
FIG. 29 illustrates a frame attached to the template of FIG. 28.
Figure 28:
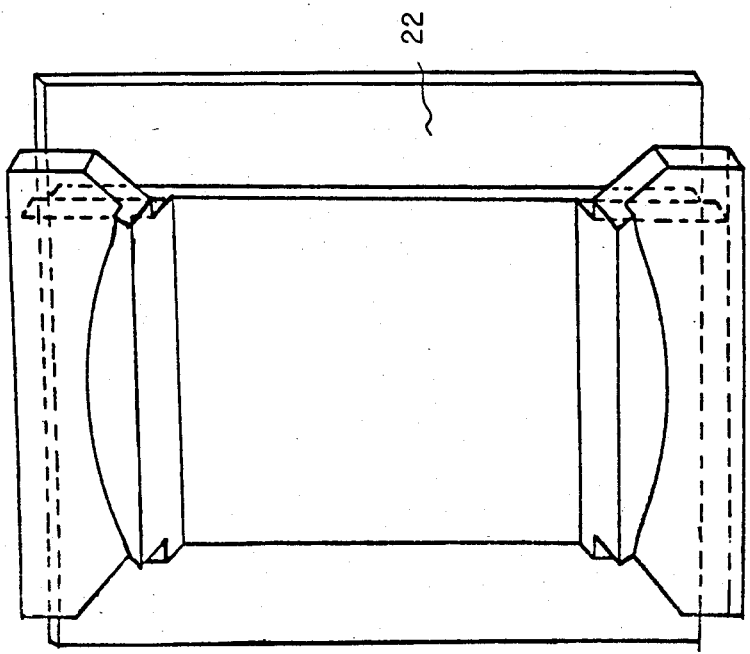
FIG. 28 illustrates a template for a frame having two cross piece forms.

When the frames comprise two or even four cross piece forms the machining and cutting of each side is done separately. The mitered sections are formed simultaneously about the four sides mounted within template 22, as illustrated in FIG. 28 when there are two cross piece forms, and within template 23, as illustrated in FIG. 30 when there are four cross piece forms, with the help of two opposed double power saws as illustrated in FIG. 27. The method for the latter two steps is then continued at rip saw station 6, as illustrated in FIGS. 19 and 20.

The corner part of FIG. 9 permits jointing of two parts of at a right angle. The machining of the hollow portions which will receive it cannot b received except from the exterior of the framework towards the interior of the framework, but can be achieved with all types of machines having one or four heads, as illustrated in FIG. 21.

Such jointing can occur with certain types of frames used for mirrors, furniture and doors, as well as for woodwork. It permits a frame, door or chassis to be finished by gluing in conventional fashion, without any additional manipulation. In such cases, the parts are cut with a lengthwise power saw having a single blade. An exception is made for a chassis having a curved cross piece which must follow the process used for the policeman's hat or the curved cross piece, as illustrated in FIG. 30.

For a hexagonal or octagonal framework, cutting can be achieved with the power saw illustrated in FIG. 22, which is equipped with guide 24. Two precut and machine lengths, which may or may not be profiled, are positioned within superimposed guide 24. The first cut crops and forms the first two mitered sections. The two precut lengths are pushed against stops 25, which have previously been adjusted to desired lengths, and successive cuts are then made, the number of which corresponds to the quantity of elements necessary to form the frame. Such cutting provides elements with parallel cuts, taken two by two, and which are again cut on one end. In this fashion finished elements can be obtained.

Figure 23:
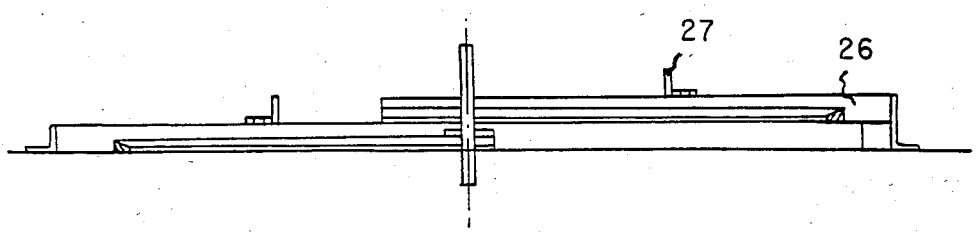
FIGS. 23 and 24 illustrate guides used to cut profiles, FIG. 23 being a vertical view and FIG. 24 being a top plan view thereof.
Figure 24:
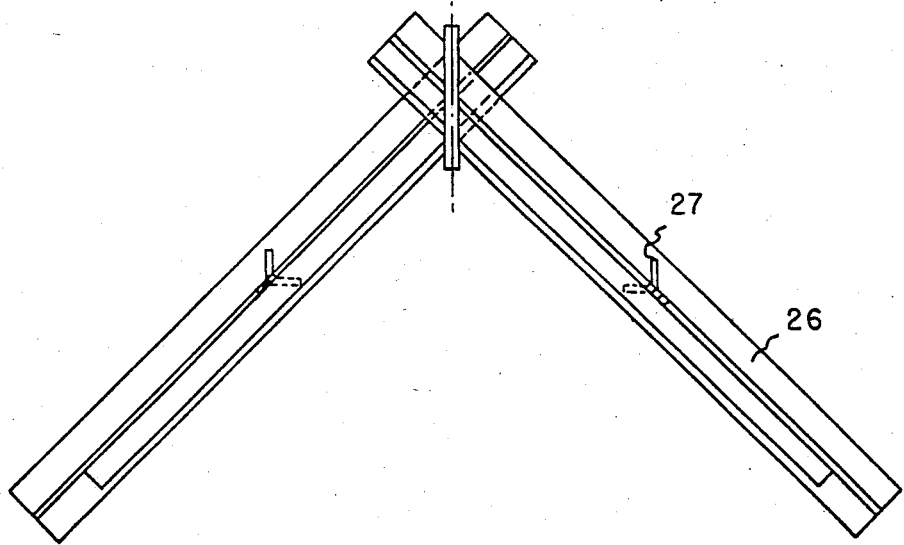

Cutting can also be obtained without guides 24, as illustrated in FIGS. 23 and 24. In this fashion, the framework elements are cut at right angles. Two elements are positioned in superimposed fashion, upon each other, within guides 26 and are oriented at a desired angle and detached to the power sources as shown in FIG. 22. Cropping is first achieved as is cutting of the first two mitered sections. The elements are returned and the mitered sections are then pushed against stops 27 of guides 26. Thereafter, a second cut is made. There are thus two finished elements in the form of perfectly parallel miters. The operation is repeated as a function of the number of elements which are necessary to comprise the frame. When the sections need to be larger, e.g., as is the case with mirrors and picture frames, corner parts of all of the types as illustrated in FIGS. 1–9 are again used.

To manufacture round or oval frames it is difficult to obtain mitered sections which can applied perfectly so as to render the joints to be invisible.

Figure 32:
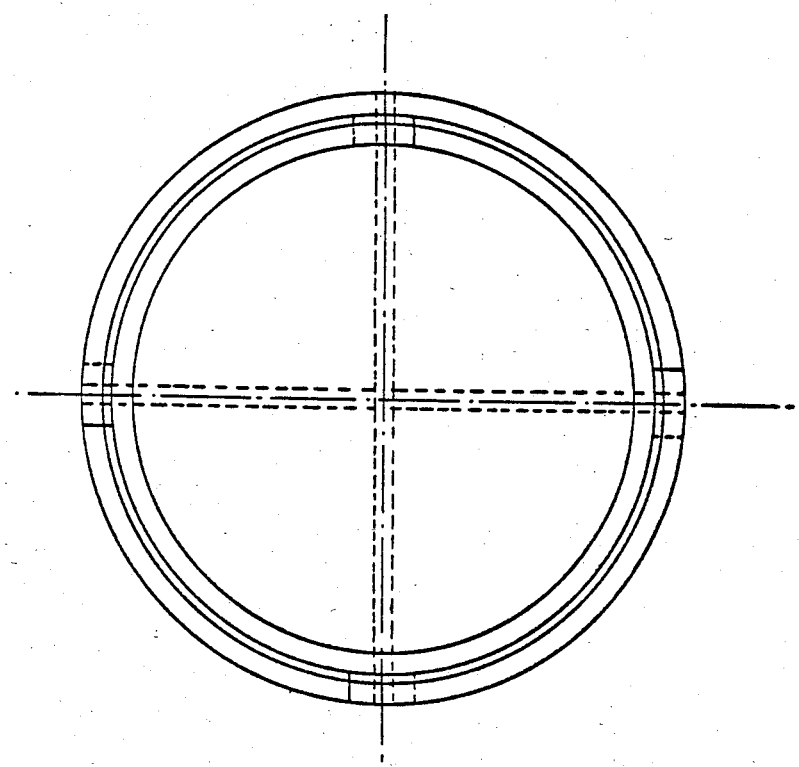
FIGS. 32 and 33 illustrate a template for a round frame, which are, respectively, a seated plan view (FIG. 32) and vertical view (FIG. 33)
Figure 33:
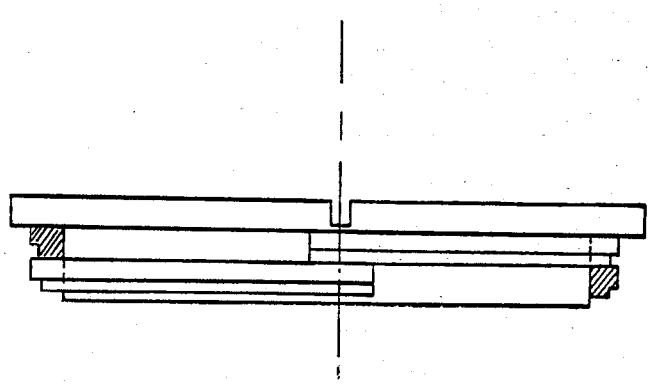

Mitering can be obtained by using a formed template which exactly fits the interior curve of the framework illustrated in FIGS. 32 and 33. Precut elements are positioned in superimposed fashion with respect to each other about the template, and tightened about it. The template is thus positioned in front of the power saw of FIG. 22 and the mitered sections to be cut are positioned by a ruler which is attached to the power saw table, which slides within a groove machine under the template, and which is illustrated in FIGS. 32 and 33 as being within the axis of the cut to be made. The template will be presented as many times as is necessary to form the cuts. With respect to other frames, if the sections and rigidity demand, the corner portions of FIGS. 1–9 are used in the conditions which are described.

Figure 34:
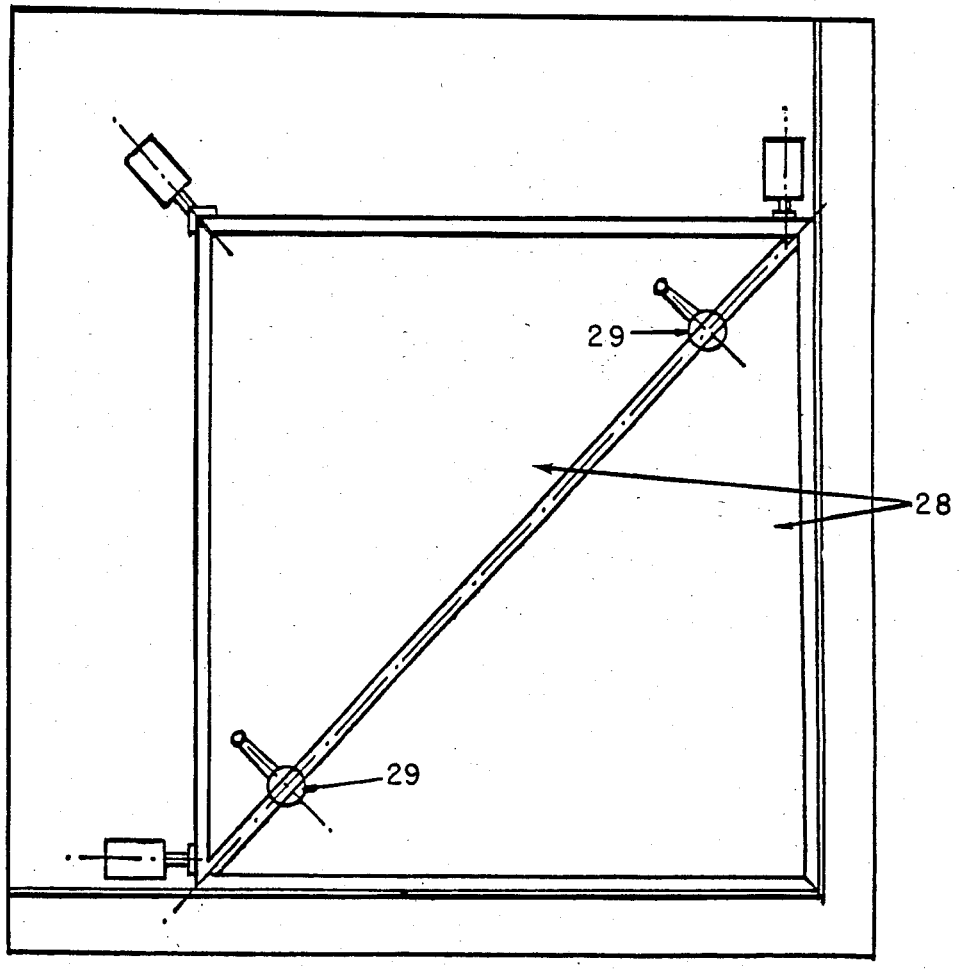
FIG. 34 is a top plan view of a template having two moveable portions which can be moved relative to one another by cams.
Figure 35:
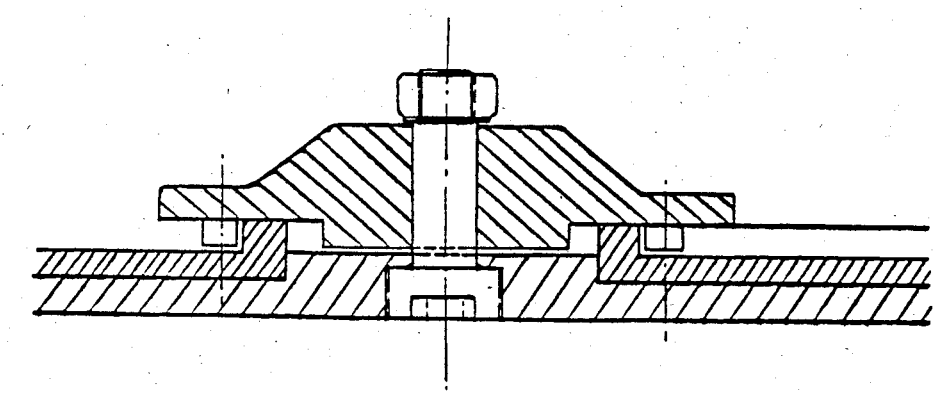
FIGS. 35 and 36 respectively, are cross-sectional and top plan views of the template illustrated in FIG. 34.
Figure 36:
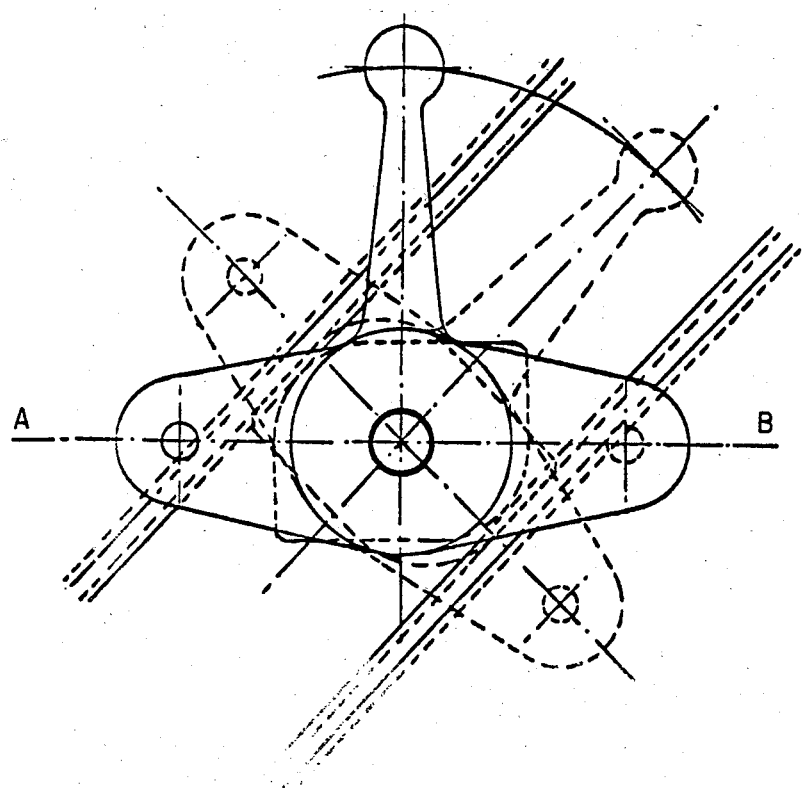

When frames with small mitered sections are joined without corner parts, the same method can be used by simply omitting the machining station and replacing the corner portions within the framework. These types of frames sometimes, however, can be jointed by the metallic corner part illustrated in FIG. 5. When these frames are squared it often prevokes deformation. To insure good framing the elements of the frame are tightened against the template as illustrated in FIG. 34. This template takes into account the deformation which tends to tighten the framework of the template to render removal difficult. To prevent this, the template can be comprised of two mobile parts 28 which can be spread apart or or moved towards one another by two cams 29, illustrated in detail in FIGS. 35 and 36, which permit the framework dimension to be altered. It also permits a loosened position which permits easy removal of the finished frame as well as placement of the elements or the following frame. Frames made in this fashion have constant quality, the miters being applied without risk of shifting. To insure perfect concordance of the profile of the mitered sections, the framed elements are glued and then positioned within the template and hooked together. The frame is then removed and sanded on its backhand side to give it a perfect flatness. These frames can also have one or more cross piece forms, e.g., a curved type or a policeman's hat. When they are cut, they will be treated in the same way as the frames.

The method when used with corner parts having small sections is the same, as the power source of FIG. 22 can be used without a base and can be controlled mechanically by foot or by hand with a handle. The templates will not change to machine the placement of corner parts in such case.

The rip saw or mortise machine is simple and has a single head. It is possible for the rip saw machine to be portable, and for the mortise machine to be formed without a base.

Small scale applications of the method is possible using the same apparatus, when the material is limited to the use of a portable rip saw machine and a power saw without a base, as illustrated in FIG. 22.

The method can also be used for odd jobs by employing apparatus which replaces the mitering boxes, when precision is problematic. The saw employed is a handsaw and the apparatus can comprise guides which may turn the blade saw vertical to insure that it will have a rectilinear path. These guides are formed from wood, plywood or plastic and can be interchangeable. The method will permit, even in this case, two mitered sections to be formed at the same time, insuring constant precision of cutting and avoiding errors due to manipulation of the parts.

The application of the method of the present invention can also be extended to jointing small furniture and drawers by using corner parts of the type illustrated in FIG. 1 having a flat end and an ogival end, or two ogival ends, by simultaneously machining the housings with a portable rip saw and by means of a guide plate whose cuts reproduce the placement of the corner parts.

It is evident that modifications of the present invention can be brought to the apparatus which has been described above, namely by substituting equivalent technical devices, without departing from the scope of the present invention.

I claim:

1. A method for miter jointing a frame which has a plurality of sides to be joined to form corners, said method comprising:
   (a) cutting the sides of said frame;
   (b) machining a corner part to be inserted into each of said corners to be joined, and machining said frame sides to have recessed portions;
   (c) positioning said sides adjacent to each other so that recessed portions on respective sides will be positioned adjacent to each other to form a plurality of hollow corners;
   (d) premounting said corner parts within said hollow corners;
   (e) gluing said corner parts into said hollow corners; and
   (f) jointing and thereafter tightening said frame, wherein said frame sides are cut to desired dimensions in step (a) by simultaneously cutting two sides, thereafter machining said frame sides to form said hollow corners.

2. Apparatus for jointing frames having corners, said apparatus comprising:
   (a) a vertical pendular power saw having two circular blades angled at approximately 90° to each other and comprising means for miter cutting sides of said frames;
   (b) a first template for positioning and retaining sides of said jointed frame in an assembled form;
   (c) means for machining hollow corner portions in two adjacent frame sides and means for machining a plurality of corner parts;
   (d) a station for gluing and pre-mounting said respective corner parts into hollow corners formed between adjacent frame sides; and
   (e) a movable template for mounting and framing sides of said frame.

3. Apparatus in accordance with claim 2 wherein said means for machining said corner portions comprises a rip saw having four heads for simultaneously machining four frame corners.

4. Apparatus in accordance with claim 2 wherein said corner portion machining means comprises a mortise machine having drill bits.

5. Apparatus in accordance with claim 2 wherein said machining means comprises a plurality of vibrating chisels.

6. Apparatus in accordance with claim 2 wherein said machining means comprises a chain.

7. Apparatus in accordance with claim 2 wherein said miter cutting means includes a plurality of interchangeable guides.

8. Apparatus in accordance with claim 2 further comprising a plurality of cuts in said guide plate which permit corner portions to be machined by a portable rip saw.

9. A corner portion in accordance with claim 2 wherein each said corner part is flat and has an ogival first end and a second bevelled end having two points which together form a 90° angle.

10. An apparatus in accordance with claim 2 wherein each said corner part is flat and has a first bevelled end and a second ogival end.

11. An apparatus in accordance with claim 2 wherein each said corner part is flat and has a first rounded end and a second bevelled end having two points which together form a 90° angle.

12. An apparatus in accordance with claim 2 wherein each said corner part is flat and has a first rounded semicircular end and a second bevelled end having two points which together form a 90° angle.

13. An apparatus in accordance with claim 2 wherein each said corner part is flat and has a first bevelled end and a second semi-circular end.

14. An apparatus in accordance with claim 2 wherein each said corner part is flat and has a first bevelled end and a second bevelled end with two points which together form a 90° angle.

15. An apparatus in accordance with claim 2 wherein each said corner part is flat and has a first semi-circular end and a second straight end.

16. An apparatus in accordance with claim 2, each said corner part being stamped from relatively thin metal and having a grooved surface, each said corner part being substantially elastic and said groove being adapted to hold glue.

* * * * *